Nov. 17, 1925. Re. 16,213

H. HARRIS

APPARATUS FOR REFINING METALS

Original Filed Feb. 16, 1922 2 Sheets-Sheet 1

INVENTOR
Henry Harris
BY
Ward Crosby & Smith
his ATTORNEYS

Nov. 17, 1925.

Re. 16,213

H. HARRIS

APPARATUS FOR REFINING METALS

Original Filed Feb. 16, 1922 2 Sheets-Sheet 2

INVENTOR
Henry Harris
BY
Ward Cushman & Smith
his ATTORNEYS

Reissued Nov. 17, 1925.

Re. 16,213

UNITED STATES PATENT OFFICE.

HENRY HARRIS, OF LONDON, ENGLAND.

APPARATUS FOR REFINING METALS.

Original No. 1,465,128, dated August 14, 1923, Serial No. 537,009, filed February 16, 1922. Application for reissue filed February 12, 1925. Serial No. 8,838.

*To all whom it may concern:*

Be it known that I, HENRY HARRIS, a subject of the King of Great Britain, residing in London, England, have invented a certain new and useful Improved Apparatus for Refining Metals, of which the following is a specification.

This invention relates to apparatus for refining molten metals of comparatively low melting point, particularly lead, by passing them through a suitable molten reagent.

The object of the invention is to provide simple and durable apparatus by means of which the molten metal and reagent may be handled in an efficient manner for the purposes intended.

The preferred apparatus comprises, among other features, a pot containing the molten reagent, a pump for raising the molten metal and discharging it into the upper part of the pot, and means for heating the molten reagent, all of these parts, according to the present preferred embodiment of the invention, being carried by a framework as a single piece of apparatus which can be lowered into a pot of molten metal for the purpose of circulating the latter through the molten reagent.

The framework may also carry a motor for driving the pump and the shaft driven by the motor may also drive a stirrer for ensuring thorough contact of the molten metal with the reagent through which it descends.

The means for heating the reagent may be a by-pass to the flue of the furnace which heats the molten metal, such by-pass being carried by the framework and so formed that it becomes connected with the flue when the apparatus is lowered into the molten metal.

The invention consists in the novel features, combinations, arrangement and construction of parts hereinafter described according to the preferred embodiment thereof, and the invention will be more particularly pointed out in the appended claims.

Figure 1:
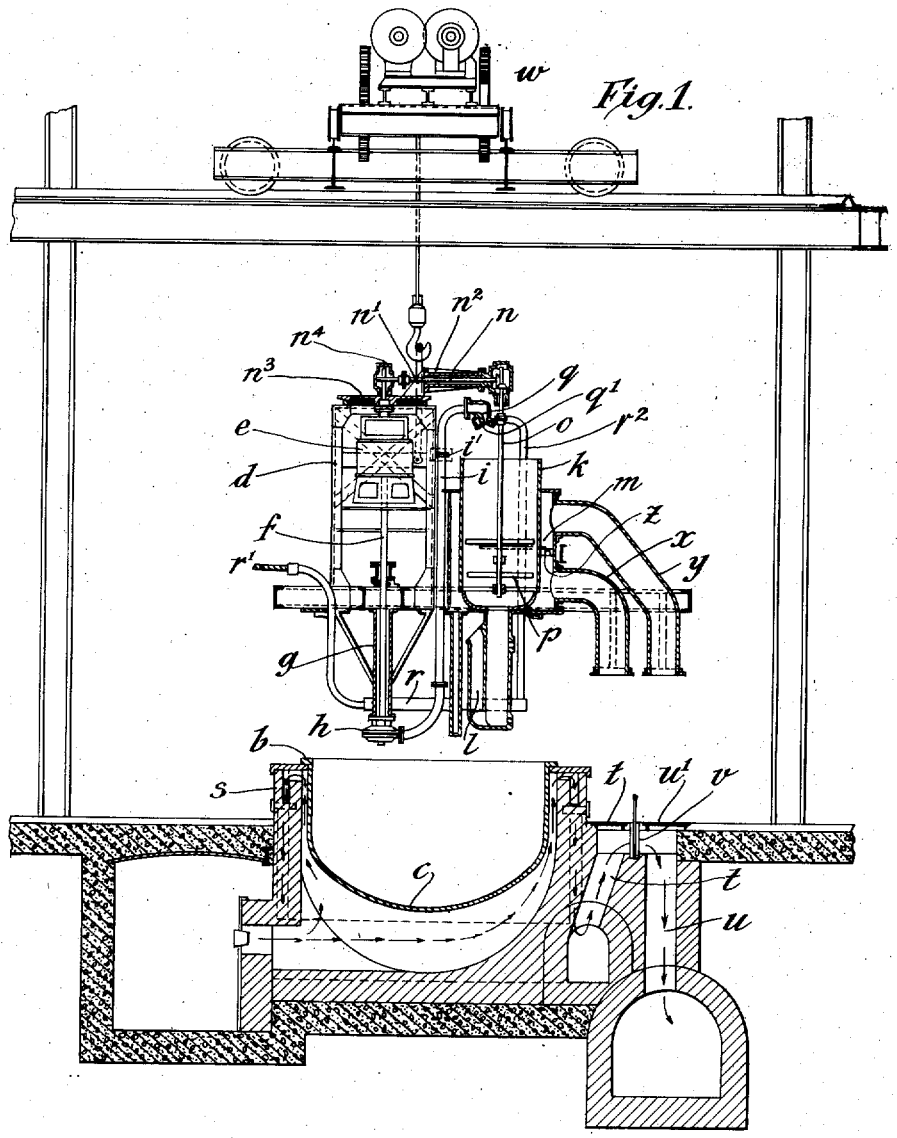
Figure 2:
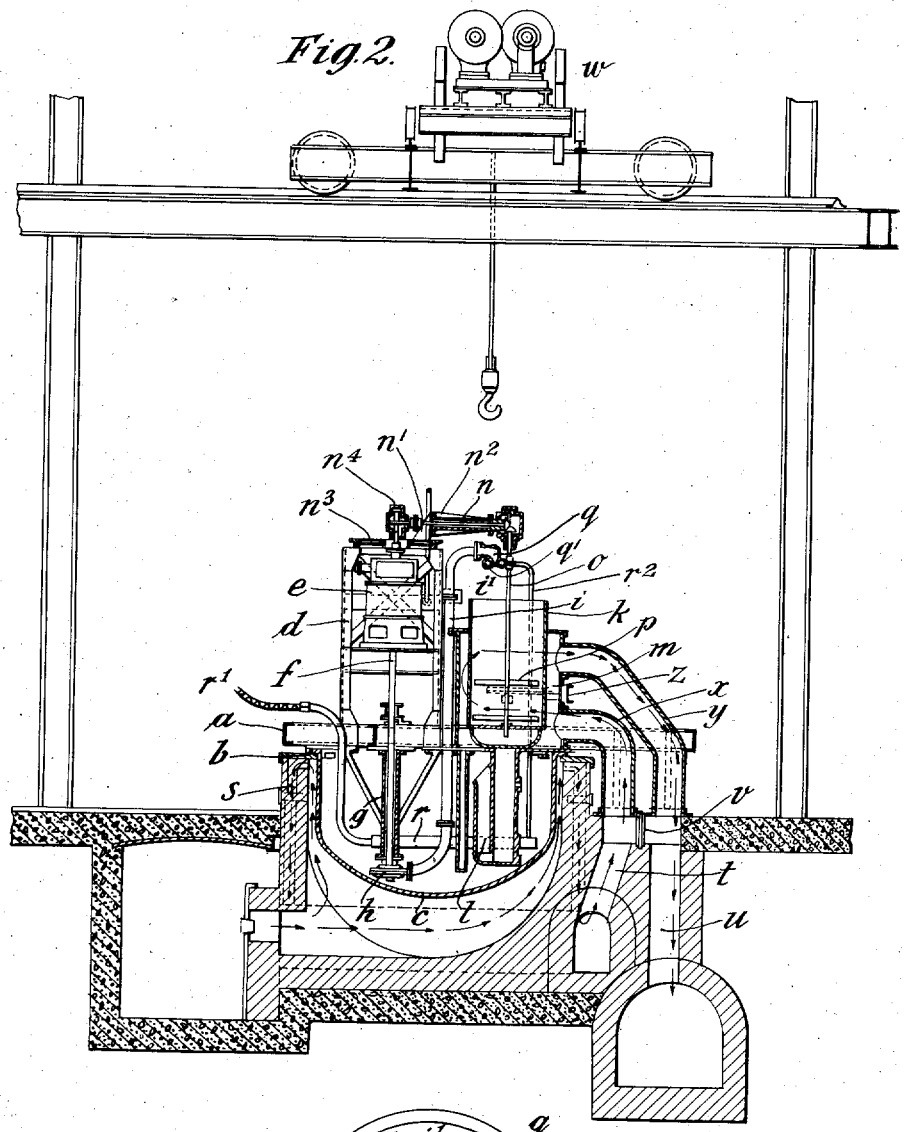

Further objects and advantages of the invention will more fully appear from the accompanying drawings illustrating the invention by way of example, and in which Figures 1 and 2 illustrate the same vertical section showing the apparatus in two positions relatively to the melting pot.

Figure 3:
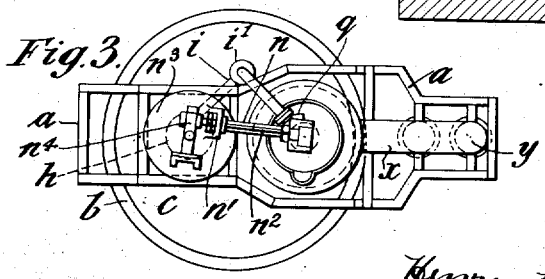

Figure 3 is a plan view.

It is assumed that lead is the metal to be refined.

The frame $a$ is adapted to rest on the rim $b$ of the melting pot $c$ and carries vertical members $d$ constituting a frame for carrying an electric motor $e$ having a vertical shaft $f$. The lower part of this shaft, below the frame $a$, is protected by an iron casing $g$ and its lower end drives with the rotary member of the centrifugal pump $h$. The delivery pipe $i$ of this pump opens above a cylindrical container $k$, the lower part of which is of considerably reduced section and has a siphon trap $l$. This container is supported by the frame $a$ and is for the purpose of containing the molten reagent (such as a mixture of common salt and caustic soda), which is retained by a seal of lead in the siphon trap $l$ and is maintained at a suitable temperature by a jacket $m$ through which hot gases circulate as presently to be described.

The upper end of the motor shaft $f$ drives, through a horizontal shaft $n$, a stirrer $o$ which works in the container $k$, the arms $p$ of which stirrer serve to deflect the molten metal and to keep the reagent in motion. The horizontal shaft $n$ is carried by a sleeve $n^2$ fixed to a bracket $n^1$ mounted on a turntable $n^3$ coaxial with the motor shaft and also carrying the gear box $n^4$. Also, the bent upper end of the delivery pipe $i$ has a swivel joint $i^1$.

The nozzle $q$ which terminates the delivery pipe $i$ is surrounded by a pipe $q^1$ perforated to deliver into the jet from the nozzle, streams of air or steam which serve to scatter the lead and at the same time supply oxygen to oxidize a small portion of the lead and thereby aid the refining action of the reagent. In the case shown steam is supplied to this perforated pipe by means of a flash boiler $r$ connected with a water supply at $r^1$ and with the perforated pipe $q^1$ by a flexible steam pipe $r^2$. The boiler $r$ is heated by the molten lead when the apparatus is at work.

The melting pot $c$ is set in a furnace the products of combustion in which pass over the bottom and sides of the pot and then pass into an annular flue $s$ to be discharged into a bent flue consisting of passages $t$, $u$ capable of separation by a damper $v$ and each closed at its upper end by a cover $t^1$, $u^1$ (Fig. 1).

The apparatus is normally suspended from a crane $w$ as shown in Fig. 1, and when it is to be used is lowered on to the melting pot, which has been charged with molten metal to be refined. This position is shown in Fig. 2, and before it has been attained the covers $t^1$, $u^1$ have been removed so that the lower ends of pipes $x$ and $y$ enter the upper ends of passages $t$ and $u$.

The pump $h$, flash boiler $r$ and trap $l$ are now heated by the molten lead; the products of combustion pass up pipe $x$ into the casing $m$ where they are compelled by the baffle $z$ to pass around the container to arrive at pipe $y$ down which they are drawn, passing through passage $u$ to the chimney flue.

When the pump is sufficiently hot the motor is started to pump the metal into the container until the lower part thereof and the trap $l$ are full. The pump is then stopped and the molten reagent is poured into the container. The motor is thereupon again started and the circulation of the metal continued until the desired degree of refining has been attained.

When the operation is completed the stirrer $o$ is detached from shaft $n$, the arm $n^2$ and the bend of the delivery pipe $i$ are turned aside, and the container is lifted by the crane for removing from it the spent reagent by pouring or dissolution.

While I have described my invention with particularity in connection with the preferred embodiment thereof, which is particularly useful in connection with relatively small pots for the treatment of relatively small batches of molten metal, it will be obvious to those skilled in the art, after understanding my invention, that various changes may be made in the arrangement, construction and combination of parts without departing from the spirit or scope of my invention, and I aim in the appended claims to cover all such changes and modifications as come within the scope of my invention.

Having thus described the nature of the said invention and the best means I know of carrying the same into practical effect, I claim:

1. Apparatus for refining molten metal by passing it through a molten reagent, comprising a melting pot for the metal, a framework adapted to be lowered over the melting pot, a container for the molten reagent carried by the framework, and means also carried by the framework and extending into the molten metal for raising the latter and delivering it into the container, the lower portion of the container having a discharge opening for the return of the metal to the melting pot.

2. Apparatus for refining a molten metal by passing it through a molten reagent, comprising a melting pot for the metal, a framework adapted to be lowered over the melting pot, a container for the molten reagent carried by the framework, a pump carried by the framework so that it is immersed in the molten metal, a delivery pipe from the pump adapted to deliver the molten metal into the container and a passage through which the molten metal returns to the melting pot from the container.

3. Apparatus for refining a molten metal by passing it through a molten reagent, comprising a melting pot for the metal, a framework adapted to be lowered over the melting pot, a container for the molten reagent carried by the framework, a pump carried by the framework so that it is immersed in the molten metal, a delivery pipe from the pump adapted to deliver the molten metal into the container and a trap at the bottom of the container adapted to seal the latter with metal and immersed in the molten metal.

4. Apparatus for refining molten metal by passing it through a molten reagent, comprising a melting pot for the metal, a framework adapted to be lowered over the melting pot, a container for the molten reagent carried by the framework, a pump carried by the framework so that it is immersed in the molten metal, a delivery pipe from the pump adapted to deliver the molten metal into the container, an extension from the bottom of the container adapted to be immersed in the molten metal and sealing the container with molten metal, and means carried by the framework for maintaining the temperature of the molten reagent.

5. Apparatus for refining a molten metal by passing it through a molten reagent, comprising a furnace, a melting pot for the metal set in the furnace, a framework adapted to be lowered over the melting pot, a container for molten reagent carried by the framework, a jacket for the container, means whereby the flue gases from the furnace pass through the jacket around the container, means carried by the framework and immersed in the molten metal for delivering the latter into the top of the container, and an extension from the bottom of the container adapted to seal the container with molten metal and through which the metal returns to the melting pot.

6. Apparatus for refining, a molten metal by passing it through a molten reagent, comprising a furnace, a melting pot for the metal set in the furnace, a framework adapted to be lowered over the melting pot, a container for molten reagent carried by the framework, a jacket for the container, means whereby the flue gases from the furnace pass through the jacket around the container, a pump carried by the framework and immersed in the molten metal, a delivery pipe from the said pump adapted to deliver the metal into the top of the container, a motor carried by the framework, a shaft to the motor driving the pump, a stirrer within the container, gearing between the shaft and the stirrer to drive the latter, and a trap at the bottom of the container through which the metal returns to the melting pot.

7. An apparatus adapted to be lowered into and raised from a melting pot for metal, comprising a container for a reagent, a pump with discharge nozzle and connections for raising the molten metal and circulating it through the molten reagent in the container, and a flash boiler and connections therefrom for discharging jets of steam close to the discharge nozzle of the pump.

8. Apparatus for refining molten metal by circulating it through a molten reagent, comprising a pot for the molten metal, a framework above the pot, a pump supported from the framework and extending into the molten metal of the pot, a reagent container having its lower end sealed by molten metal, and a delivery pipe extending from the pump to the upper end of the reagent container and having a swiveled upper portion adapted to be swung over and away from the upper portion of the container.

9. Apparatus for refining molten metal by circulating it through a molten reagent, comprising a pot for the molten metal, a framework above the pot, a pump extending from the framework into the molten metal of the pot, a reagent container having its lower end sealed by molten metal, a shaft on said framework for driving the pump, a pipe for conveying the molten metal from the pump to the reagent container, a stirrer in the reagent container and a driving shaft for the stirrer detachably connected thereto and geared to the pump shaft and swiveled to be swung over and away from the reagent container.

10. Apparatus for refining molten metal by circulating it through a molten reagent, comprising a pot for the molten metal, a framework above the pot, a pump extending from the framework into the molten metal of the pot, a reagent container having its lower end sealed by molten metal, and a delivery pipe extending from the pump to the upper end of the reagent container, means immersed in the molten metal for providing a heated oxidizing fluid, and a connection from said heating means for conveying said heated oxidizing fluid to the molten metal adjacent the top of the reagent container.

11. Apparatus for refining molten metal by circulating it through a molten reagent, comprising a pot for the metal, a furnace for heating same, said furnace having flues extending therefrom, a removable reagent container sealed at its lower end by molten metal, means for circulating the molten metal from the pot through the reagent container, a heating chamber about the reagent container movable therewith, and flues extending from said heating chamber and adapted to register with those from the furnace when the reagent container is placed in operative position.

12. Apparatus for refining molten metal by circulating it through a molten reagent, comprising a pot for the metal, a reagent container for molten reagent, said container having an upper mixing portion and a lower portion adapted to be sealed by molten metal, a pump in said pot with connections for circulating the molten metal through the reagent container, and a stirrer in said upper portion of the reagent container for stirring the molten reagent during the circulation of the metal therethrough.

13. Apparatus for refining molten metal by circulating it through a molten reagent, comprising a pot for the metal, a framework adapted to be lowered over the pot, a container for the molten reagent carried by the framework and a pump also carried by the framework and extending into the molten metal and having connections for delivering molten metal into the container, said reagent container having an upper mixing portion and a discharge opening for the return of the metal to the pot, said opening being sealed by the molten metal.

In testimony whereof I have signed my name to this specification.

HENRY HARRIS.